United States Patent [19]

Greiner

[11] Patent Number: 5,993,013
[45] Date of Patent: Nov. 30, 1999

[54] AUTOMATIC TILTING SIDE VIEW MIRROR

[76] Inventor: Michael Greiner, 877 Palm St., Altadena, Calif. 91001

[21] Appl. No.: 08/914,362

[22] Filed: Aug. 19, 1997

Related U.S. Application Data

[60] Provisional application No. 60/024,162, Aug. 19, 1996.
[51] Int. Cl.⁶ ..................... G02B 5/08
[52] U.S. Cl. ........... 359/603; 359/604; 359/605; 359/872; 359/873; 248/476
[58] Field of Search ............ 359/603, 604, 359/605, 608, 609, 872, 873, 875, 877; 248/476, 479, 484, 495

[56] References Cited

U.S. PATENT DOCUMENTS

| | | | |
|---|---|---|---|
| 3,722,984 | 3/1973 | Brean | 359/605 |
| 4,673,197 | 6/1987 | Shtipelman et al. | 283/34 |
| 4,998,752 | 3/1991 | Judson | 283/34 |
| 5,273,432 | 12/1993 | White | 434/150 |
| 5,472,239 | 12/1995 | Trujillo | 283/34 |
| 5,798,881 | 8/1998 | Mazureck et al. | 359/872 |

*Primary Examiner*—Cassandra Spyrou
*Assistant Examiner*—Mohammad Y. Sikder
*Attorney, Agent, or Firm*—Goldstein & Canino

[57] ABSTRACT

An automatic tilting side view mirror comprising a housing, a mirror pivotally connected to the housing, and a solenoid link pivotally connected to both the mirror and the housing. The solenoid link moves the mirror from a normal viewing position to its antiglare viewing position when the driver manually shifts the rear view mirror to an anti-glare viewing position or when the rear view mirror is automatically shifted to an anti-glare viewing position.

3 Claims, 5 Drawing Sheets

AUTOMATIC TILTING SIDE VIEW MIRROR

This application claims benefit of provisional application 60/024,162, filed Aug. 19, 1996.

BACKGROUND OF THE INVENTION

The invention relates to an automatic tilting side view mirror. More particularly, the invention relates to an external side view mirror for an automobile which shifts from a normal viewing position to an anti-glare viewing position when the automobile's interior rear view mirror is set to its anti-glare viewing position.

Night driving can be very dangerous. Aside from the lack of visibility, a driver also has to deal with the veritable problem of glare. The headlights of an approaching vehicle can cause a glaring light to propagate from both the rear view mirror and the side view mirrors of an automobile. Aside from causing discomfort, this glare can be quite precarious because it can obstruct a driver's vision from road obstacles ahead.

The prior art does not disclose a side view mirror which automatically acts to prevent the effects of glare. However, interior rear view mirrors with adjustable mirror surfaces that prevent some of the effects of glare have become known in the art. The conventional rear view mirror has a manual switch which selectively moves the rear view mirror between a normal viewing position and an anti-glare viewing position.

U.S. Pat. No. 4,614,404 to Greene et al. discloses an anti-glare rear view mirror which is manually operated by the driver using a switch located within the motor vehicle. Actuation of said switch causes the mirror to pivot between two predetermined operating positions to provide high and low brightness images. The mirror is supported by a housing for pivotal motion. Two permanent magnets are secured to the rear surface of the mirror. An adjustable plate is also supported by the housing. Two solenoids are secured to a front surface of the adjustable plate in opposed relationship to the permanent magnets. When the switch is actuated by the driver the solenoids energize and attract the magnets on the back surface of the mirror thereby shifting the mirror into a anti-glare viewing position.

U.S. Pat. No. 4,266,856 to Wainright also discloses an interior rear view mirror device having a mirror element which pivots from a normal position to an anti-glare position in response to headlight glare. However, the pivoting of the mirror is automatic. A photosensor located behind a partly silvered region of the mirror glass measures the intensity of light at the mirror surface. In response to an overly bright light, the photosensor actuates a solenoid in the housing which shifts the mirror into an anti-glare viewing position.

U.S. Pat. No. 4,838,650 Stewart et al. discloses a rear view mirror which also senses glare by means of a photosensor. However, the mirror glass is shifted to an anti-glare position by means of an annular cam formation attached between a mirror and a housing.

U.S. Pat. No. 4,781,436 to Armbruster discloses an anti-glare rear view mirror which is manually operated by the driver by means of a feather-touch switch secured to the rear view mirror.

A disadvantage of the conventional side view mirror is that it operates independent of the rear view mirror. If the rear view mirror is set to an anti-glare viewing position the side view mirrors will remain in their original position and will continue to reflect an annoying and dangerous glare.

The above mentioned problem may be eased in part by manually moving each of the side view mirrors to divert the glare. However, doing so while driving without the aid of a passenger is practically impossible. Electrically controlled side view mirrors can be adjusted manually each time the driver senses a glare, however, this would require the driver to stop the vehicle to readjust the mirrors. Further, the two side view mirrors must normally be adjusted separately. Attempting to readjust the side view mirrors while driving can be very dangerous because it diverts the drivers attention away from the road.

While the conventional side view mirror systems may be suitable for the particular purpose employed, or for general use, they would not be as suitable for the purposes of the present invention as disclosed hereafter.

SUMMARY OF THE INVENTION

It is an object of the invention to produce a side view mirror which prevents the effects of glare.

It is another object of the invention to produce a side view mirror which automatically shifts from a normal viewing position to an anti-glare viewing position when the automobile's interior rear view mirror is manually shifted into an anti-glare viewing position.

It is another object of the invention to produce a side view mirror which cooperates with an automatic anti-glare rear view mirror to prevent the effects of glare.

The invention is an automatic tilting side view mirror comprising a housing, a mirror pivotally connected to the housing, and a solenoid link pivotally connected to both the mirror and the housing. The solenoid link moves the mirror from a normal viewing position to its antiglare viewing position when the driver manually shifts the rear view mirror to an anti-glare viewing position or when the rear view mirror is automatically shifted to an anti-glare viewing position.

To the accomplishment of the above and related objects the invention may be embodied in the form illustrated in the accompanying drawings. Attention is called to the fact, however, that the drawings are illustrative only. Variations are contemplated as being part of the invention.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
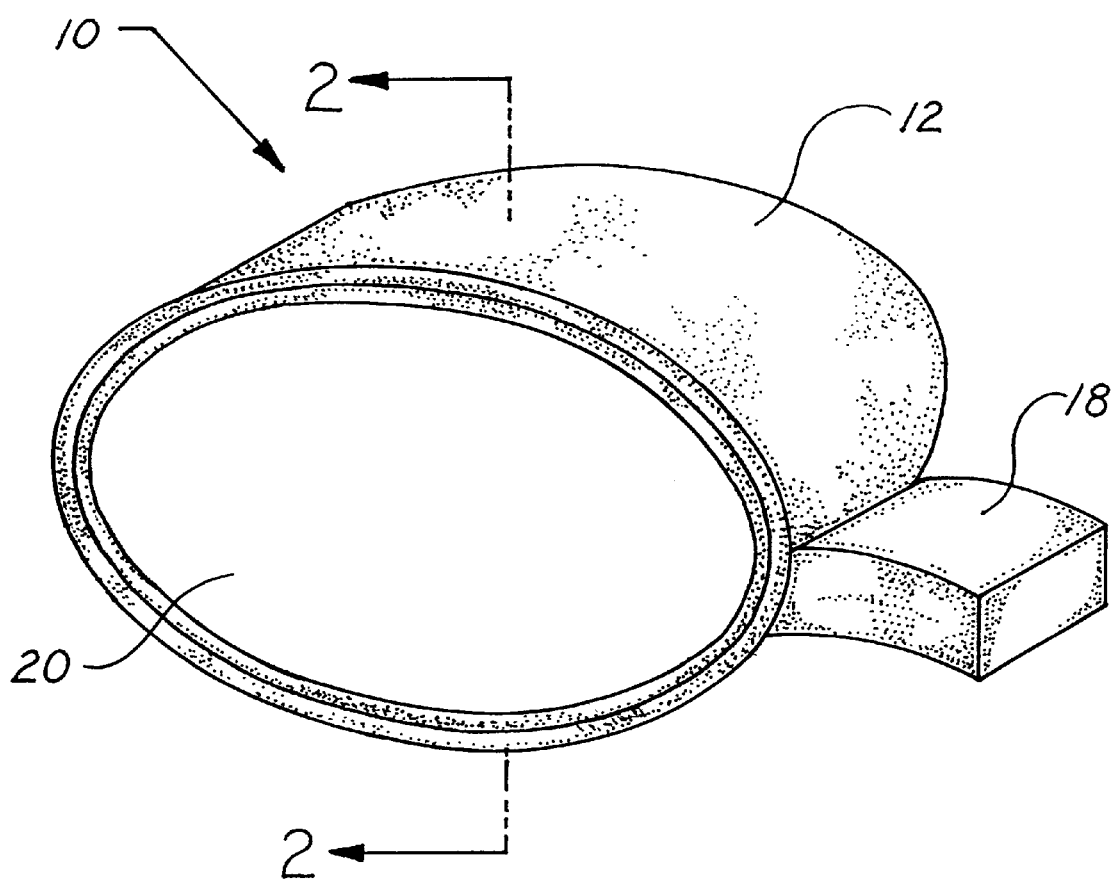
FIG. 1 is a perspective view of the automatic tilting side view mirror.

FIG. 1 illustrates an automatic tilting side view mirror apparatus 10 comprising a side view mirror having anti-glare capability 20 and a concave housing 12. The housing is secured to the exterior of a vehicle by means of a housing attachment 18.

Figure 2:
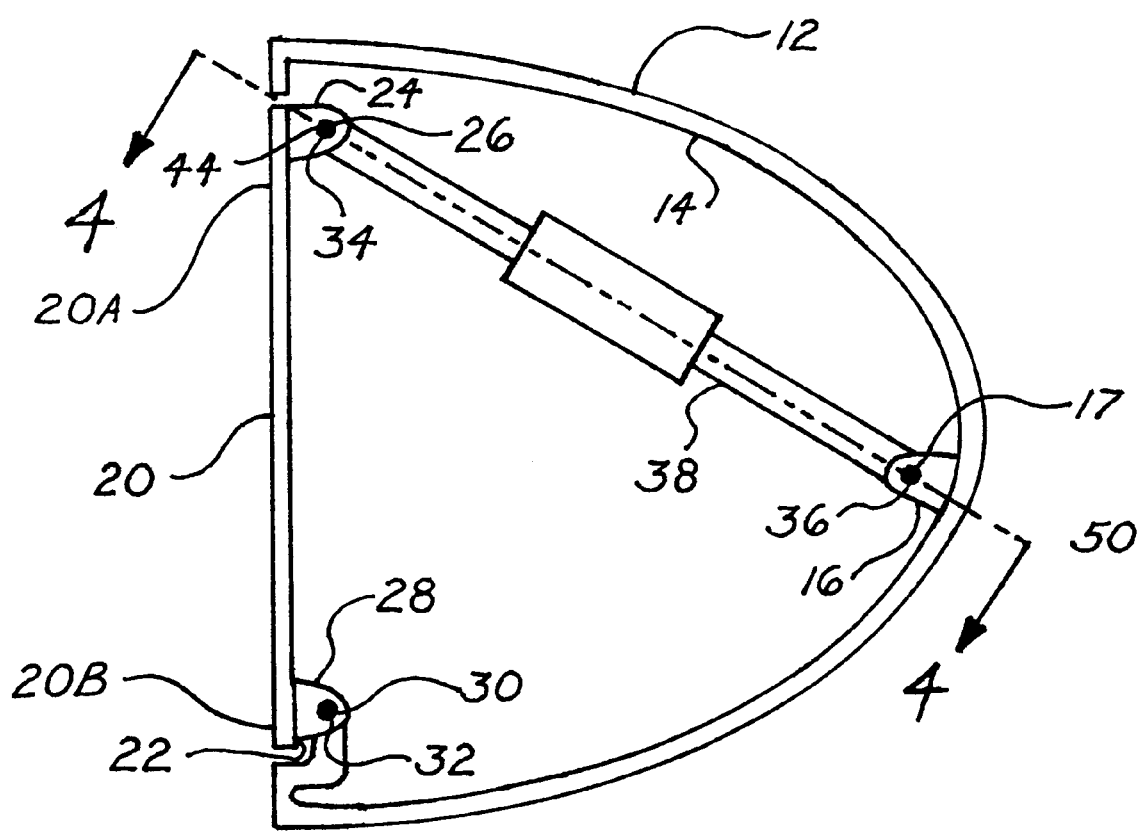
FIG. 2 is a cross sectional view taken along line 2—2 in FIG. 1, illustrating the internal structure of the side view mirror according to the instant invention.
Figure 3:
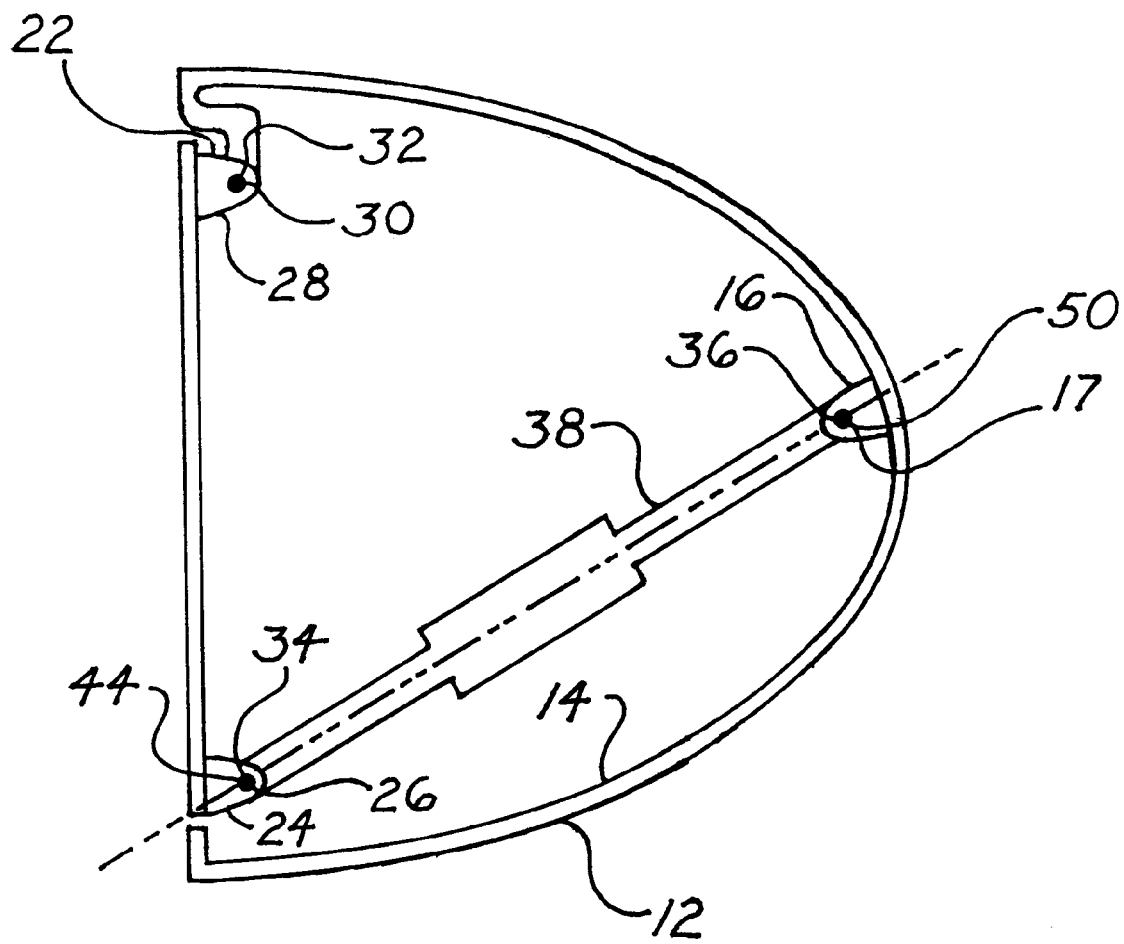
FIG. 3 is a cross sectional view taken along line 3—3 in FIG. 2, illustrating a solenoid link.

As illustrated in FIG. 2 the concave housing 12 has an open end 13, a housing inner surface 14 and a housing inner surface bracket 16. The housing inner surface bracket 16 has a housing inner surface bracket bore 17. The mirror 20 has a top end 20A, a bottom end 20B, a mirror inner surface 22, a mirror inner surface top bracket 24 having a mirror inner surface top bracket bore 26, and a mirror inner surface bottom bracket 28 having a mirror inner surface bottom bracket bore 30. The mirror inner surface bottom bracket 28 and the mirror inner surface top bracket 24 project from the mirror inner surface 22 and are spaced a predetermined distance apart. The mirror inner surface bottom bracket 28 is attached to the housing 12 by a first pivot pin 32 for pivotal motion between two predetermined operating positions to provide images of varying brightness. A solenoid link 38 attaches between the mirror inner surface top bracket 24 and the housing inner surface bracket 16. The solenoid link 38 has a solenoid link plunger top portion bore 44 and a solenoid link bottom end portion bore 50. A second pivot pin 34 is snapped into both the mirror inner surface top bracket bore 26 and the solenoid link plunger top portion bore 44. Said second pivot pin 34 attaches the solenoid link 38 to the mirror 20 allowing the two elements to pivot relative to each other. A third pivot pin 36 is snapped into both the solenoid link bottom end portion bore 50 and the housing inner surface bracket bore 17. Said third pivot pin 36 attaches the solenoid link 38 to the housing 12 allowing the two elements to pivot relative to each other. The mirror inner surface top bracket 24 and the housing inner surface bracket 16 lie in the same plane. To produce the desired anti-glare effect, the side-view mirror must face toward a dark surface. The embodiment of the invention as previously discussed has the side view mirror facing upward towards the dark sky in the anti-glare position. Alternatively, the mirror can pivot on the top and face downward in the ant-glare position facing the dark road surface as shown in FIG. 3.

Figure 4:
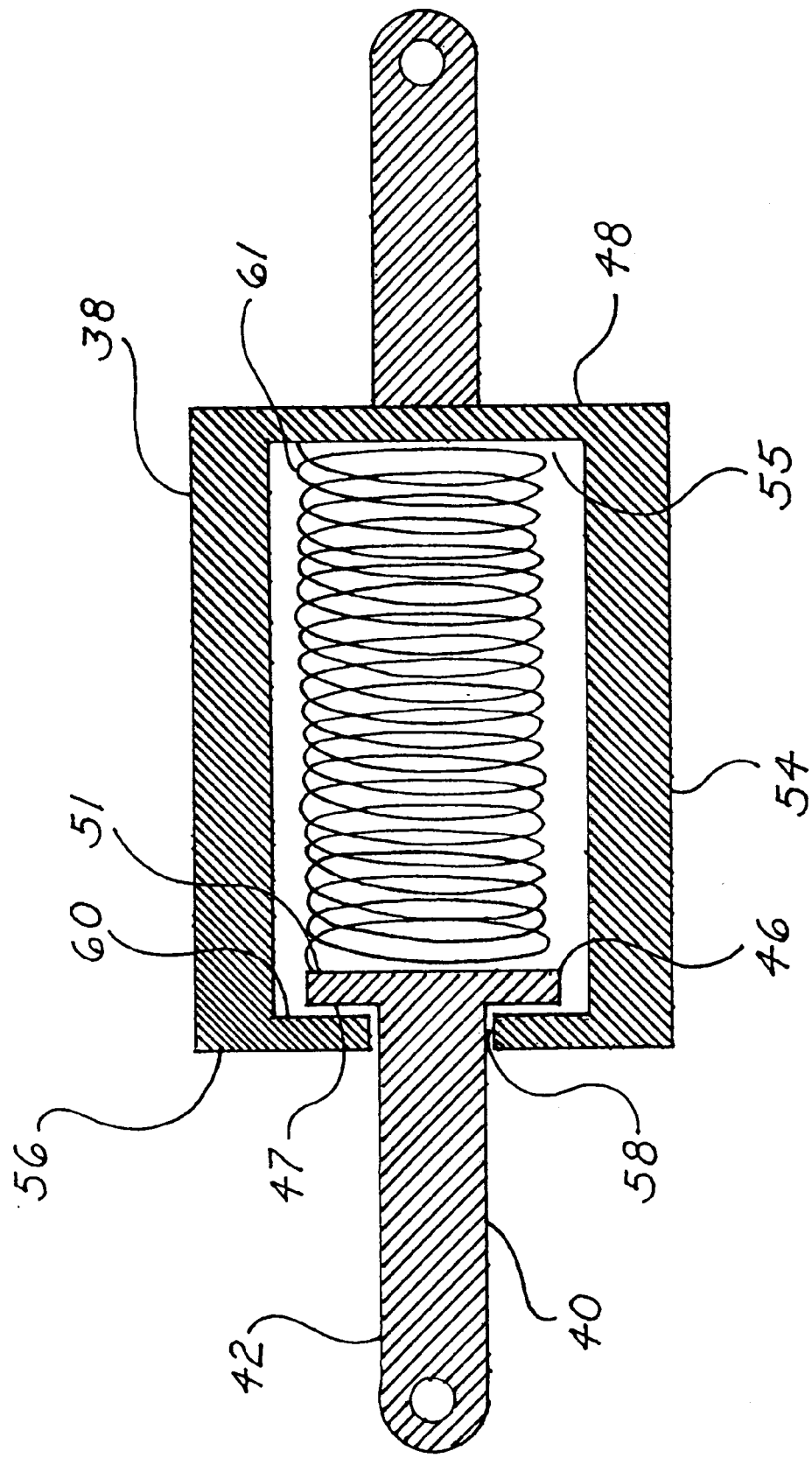
FIG. 4 is a solenoid link with plunger of the present invention.

FIG. 4 illustrates the solenoid link 38 having a solenoid link plunger 40, a solenoid link solenoid 54, a solenoid link top end portion 56, and a solenoid link bottom end portion 48. The solenoid link solenoid 54 has a solenoid link solenoid bore 55. The solenoid link top end portion 56 has a solenoid link top end portion bottom surface 60 and a solenoid link top end portion bore 58. The solenoid link solenoid 54 envelopes a solenoid link compression spring 61 and the solenoid link plunger 40. The solenoid link plunger 40 has a solenoid link plunger top portion 42 and a solenoid link plunger bottom portion 46. The solenoid link plunger bottom portion 46 has a solenoid link plunger bottom portion top surface 47 and a solenoid link plunger bottom portion bottom surface 51. The solenoid link plunger bottom portion 46 has a larger diameter than the solenoid link plunger top portion 42. The solenoid link plunger bottom portion 46 has a smaller diameter than the diameter of the solenoid link solenoid bore 55. The solenoid link plunger bottom portion 46 is contained within the solenoid link solenoid bore 55 between the solenoid link top end portion bottom surface 60 and the solenoid link bottom end portion 48. The solenoid link compression spring 61 is located inside the solenoid link solenoid bore 55 between the solenoid link plunger bottom portion 46 and the solenoid link bottom end portion 48. The solenoid link compression spring 61 contacts the solenoid link plunger bottom portion bottom surface 51 and maintains contact between the solenoid link plunger bottom portion top surface 47 and the solenoid link top end portion bottom surface 60. When the solenoid link plunger bottom portion top surface 47 and the solenoid link top end portion bottom surface 60 are in contact, as illustrated in FIG. 3, the mirror 20 is in the normal viewing position. When the solenoid link solenoid 54 is energized the solenoid link plunger 40 is drawn towards the solenoid link bottom end portion 48 compressing the compression spring 61 and pivoting the mirror 20 about the second pivot pin 34 into an antiglare viewing position.

Figure 5:
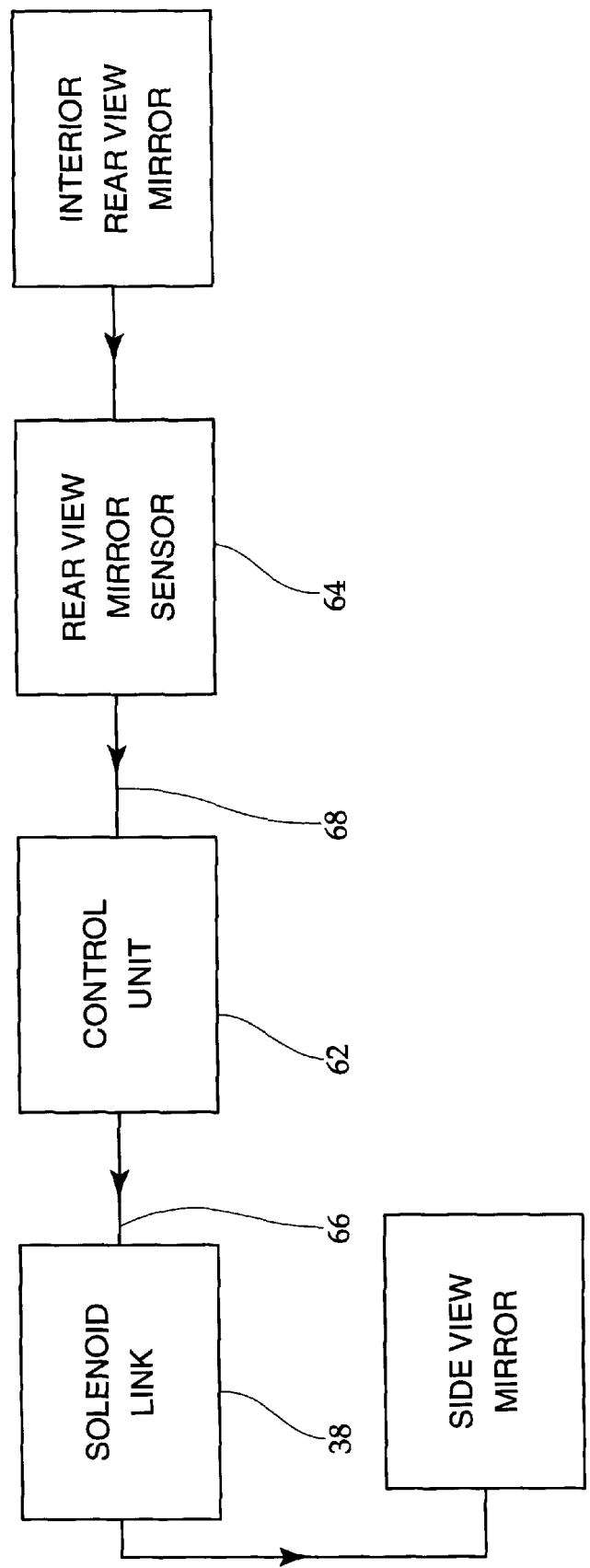
FIG. 5 is a block diagram of the automatic tilting side view mirror electrical system.

FIG. 5 illustrates a block diagram of the major components of the automatic tilting side view mirror 10. A rear view mirror sensor 64 attached to a rear view mirror senses when the driver manually shifts the rear view mirror to an anti-glare viewing position or when the rear view mirror is automatically electronically shifted to an antiglare viewing position, and generates a rear view mirror movement signal 68. A control unit 62 is connected between the rear view mirror sensor 64 and the solenoid link 38. The control unit 62 generates a side view mirror movement signal 66 when the control unit 62 detects the rear view mirror movement signal 68. The solenoid link 38 shifts the mirror 20 into an anti-glare viewing position when it receives the side view mirror movement signal 66 from the control unit 62.

In conclusion, herein is presented a system for automatically pivoting the side view mirrors of a vehicle when the rear view mirror is either manually or automatically moved to its antiglare position.

I claim:

1. What is claimed is an automobile side view mirror apparatus which automatically tilts upward to a non-glare position when an automobile interior rear view mirror is moved into a non-glare position comprising;

a concave housing having an open end and an inner surface;

a side view mirror having anti-glare capability fitted on the open end of the housing, the side view mirror having a top end and a bottom end, the bottom end of the side view mirror being pivotally attached to the housing;

a connection device to connect the top end of the side view mirror to the inner surface of the housing;

a mechanism for moving the connection device when the rear view mirror is moved into the non-glare position wherein the side view mirror pivots on the bottom end and tilts upward to the non-glare position.

2. What is claimed is an automobile side view mirror apparatus which automatically tilts downward to a non-glare position when an automobile interior rear view mirror is moved into a non-glare position comprising;

a concave housing having an open end and an inner surface;

a side view mirror having anti-glare capability fitted on the open end of the housing, the side view mirror having a top end and a bottom end, the top end of the side view mirror being pivotally attached to the housing;

a connection device to connect the bottom end of the side view mirror to the inner surface of the housing;

a mechanism for moving the connection device when the rear view mirror is moved into the non-glare position wherein the side view mirror pivots on the top end and tilts downward to the non-glare position.

3. What is claimed is an automobile side view mirror apparatus which automatically tilts downward to a non-glare position when an automobile interior rear view mirror is moved into a non-glare position comprising;

a concave housing having an open end and an inner surface;

a side view mirror having anti-glare capability fitted on the open end of the housing, the side view mirror having a top end and a bottom end, the top end of the side view mirror being pivotally attached to the housing;

a solenoid connection device to connect the bottom end of the side view mirror to the inner surface of the housing;

a mechanism for activating the solenoid when the rear view mirror is moved into the non-glare position wherein the solenoid pivots the side view mirror on the top end and the side view mirror tilts downward to the non-glare position.

* * * * *